Figure 1:
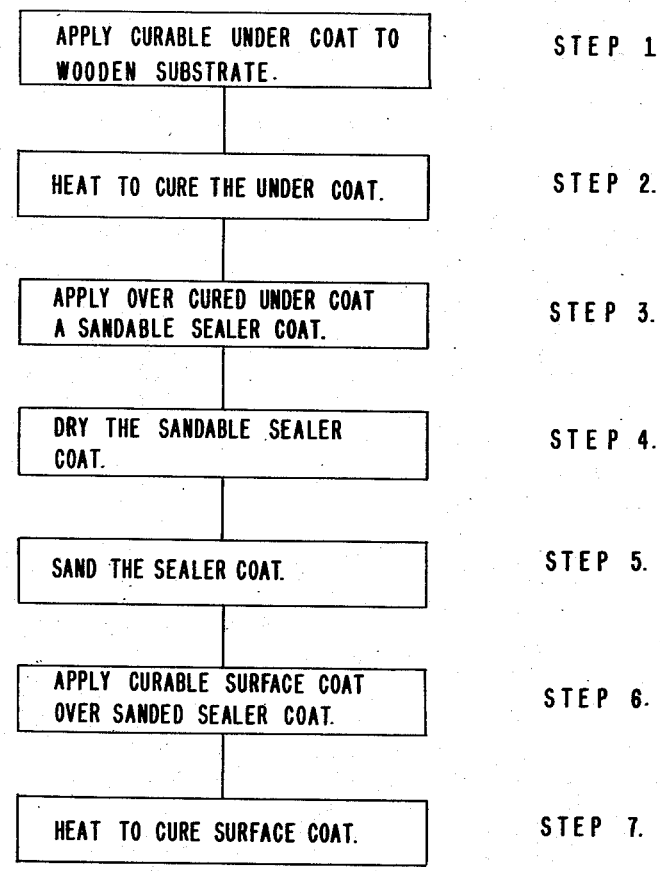

Dec. 4, 1956 A. C. BUCK 2,772,986
METHOD OF FINISHING WOOD AND PRODUCT THEREOF
Filed April 28, 1954

INVENTOR
ALLEN C. BUCK

BY *P. J. Poindexter*

AGENT

United States Patent Office 2,772,986
Patented Dec. 4, 1956

2,772,986

METHOD OF FINISHING WOOD AND PRODUCT THEREOF

Allen C. Buck, Drexel Hill, Pa., assignor to E. I. du Pont de Nemours and Company, Wilmington, Del., a corporation of Delaware Application April 28, 1954, Serial No. 426,312

9 Claims. (Cl. 117—72)

This invention relates to improvements in wood finishing. More particularly the invention pertains to an improved system for finishing wood with coating compositions comprising a polymerizable monomer having two acrylic ester groups in the monomer molecule.

Formulation of wood finishing compositions with polymerizable monomers having two methacrylic or acrylic ester groups in the molecule provides compositions sprayable at a high non-volatile content and the resulting cured finish is characterized by unusual clarity, toughness, high degree of scratch adhesion, mar-resistance and resistance to organic solvents. The acrylic and methacrylic diesters of polymethylene glycols, polyethylene glycols and polypropylene glycols have been found to be particularly useful in the formulation of such coating compositions. While these prior art coating compositions possess desirable properties attributed to the difunctional acrylic component, they have the disadvantage of processing deficiencies in the cured state. The tough and solvent resistant polymerized or cured coating on a wooden substrate is exceedingly difficult to sand to the desired smoothness. The liquid coating as applied follows the contours of the wooden substrate and although the crevices, valleys, and pores of the substrate are substantially filled initially with liquid coating, solvent loss and shrinkage during curing leaves the substrate incompletely filled. The high degree of clarity and gloss of the coating magnifies the imperfections and irregularities in the surface. These imperfections and irregularities may be minimized by rubbing or sanding each coat and applying a multiplicity of coats, but it is uneconomical and impractical to seek this remedy of applying a greater film build than is required for service and for high quality appearance.

It is an object of this invention to circumvent this disadvantage encountered in application of coating compositions comprising polymerizable monomeric methacrylic and acrylic diesters of aliphatic dihydric alcohols. It is a further object of this invention to provide improvements in the method of finishing wood which facilitates the ease of processing a composite finish comprising difficultly sandable polymerized coatings to a smooth finish free of surface imperfections and undulations reflecting the irregular profile of the wooden substrate. Another object is to provide a wooden substrate coated with a composite finish having the toughness, mar-resistance, high order of scratch adhesion, chemical resistance and clarity characteristic of coatings comprised of polymerized methacrylic acid diesters of aliphatic dihydric alcohols and freedom from surface imperfections which are normally accentuated by said diester components of the coating in the cured state. Additional objects will become apparent as the description of the invention proceeds.

These objects are accomplished by an improved process for finishing wood comprising the steps of applying to a wooden substrate an undercoat composition comprising a polymerizable acrylic or methacrylic acid diester of a lower aliphatic dihydric alcohol in volatile organic solvent, heating to dry and cure the undercoat, superimposing over the cured undercoat composition a nitrocellulose lacquer sealer coating composition free of the polymerizable acrylic or methacrylic diester in a volatile organic solvent, drying the sealer composition, sanding the dried sealer to the desired degree of smoothness and applying a surface coat over the sanded sealer comprising the polymerizable acrylic or methacrylic diester of a lower aliphatic dihydric alcohol in volatile organic solvent, and heating to dry and cure the surface coat.

The invention further contemplates the use of wash coats, prefill compositions and fillers as pretreating compositions on the wood prior to application of the polymerizable undercoat. Application of conventional lacquer and resinous coating compositions over the polymerized surface coat is also contemplated.

Figure 2:
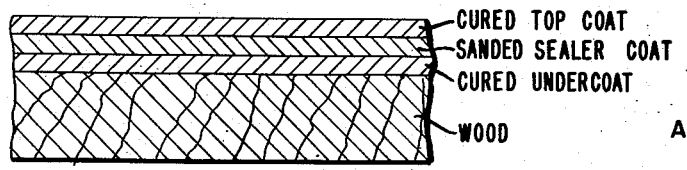

Figure 1 of the drawing is a flow sheet of the process of this invention. Figure 2 is a cross section illustration showing the wood substrate, cured undercoat, sanded intermediate coat and cured surface coat.

In order that one skilled in the art may better understand the invention, the following examples are given by way of illustration and not by way of limitation. All parts are by weight unless otherwise designated.

EXAMPLE I

In one specific method for finishing wood in accordance with this invention a plate glass-like surface was produced on a mahogany panel stained in a conventional manner and then filled by spraying on the surface of the stained panel a coat of the following aqueous filler composition:

| | Parts by weight |
|---|---|
| Aqueous 55% polyvinyl acetate dispersion ("Elvacet" 81–900) | 72.7 |
| Methyl phthalyl ethyl glycolate | 4.0 |
| Water | 23.3 |
| | 100.0 |

The filler composition was worked into the pores and other openings in the wood surface by rubbing and wiping with a sponge, cotton waste, or burlap, leaving a thin wet film of filler composition over the entire surface. The applied filler was permitted to dry at room temperature for about 30 minutes during which time the film coalesced to a clear coating. The dry film was sanded lightly to remove high spots and surface irregularities. Then the following oil-type pigmented paste wood filler was applied to accentuate the contrast in the wood grain and to fill minor depressions remaining after shrinkage of the aqueous polyvinyl acetate filler.

Oil-based type filler

| | Parts by weight |
|---|---|
| Alkyl resin | 9.2 |
| Raw linseed oil | 2.0 |
| Linseed oil acids | 1.0 |
| Driers—Iron, manganese and lead naphthenates | 2.1 |
| Van Dyke brown pigment | 7.5 |
| Amorphous silica pigment | 6.0 |
| Talc pigment | 6.0 |
| Calcium sulfate pigment | 44.4 |
| Mineral spirits | 21.8 |
| | 100.0 |

The filler was applied in the normal manner and worked into the partially filled pores and depressions in the surface. The excess filler was removed by wiping with a soft cloth.

Without necessarily permitting the filler to dry, the following polymerizable undercoat composition was applied as an undercoat directly thereover by spraying.

*Polymerizable wood finishing undercoat composition*

| | Parts by weight |
|---|---|
| Cellulose nitrate | 13.5 |
| Dehydration alcohol—Ethyl alcohol | 5.8 |
| Monomeric dimethacrylate of triethylene glycol | 13.5 |
| Ethyl acetate | 22.2 |
| Butyl acetate | 19.3 |
| Anhydrous ethyl alcohol | 11.8 |
| Xylene | 13.5 |
| Cobalt nitrate hexahydrate | 0.4 |
| | 100.0 |

The solvents in the polymerizable undercoat composition penetrated through the secondary filler to attack the vehicle of the polyvinyl acetate filler, thereby adhesively anchoring an inherently weak oil-based filler between a tough primary filler and a tough superimposed coating. The undercoat was dried and cured in an oven for 1 hour at a temperature of about 130° F. While the surface of the filled and undercoated panel was substantially smooth, it did not present a plate glass-like appearance. It is important that the undercoat be cured sufficiently to prevent swelling of the undercoat when a sanding sealer composition is superimposed thereon. Sanding of the polymerized undercoat is difficult due to the toughness and resiliency of the cured film.

One coat of the following easily sandable cellulose nitrate sealer composition was sprayed over the cured or polymerized undercoat:

*Sanding lacquer sealer composition*

| | Parts by weight |
|---|---|
| Cellulose nitrate | 7.7 |
| Alkyl resin solution [1] | 8.5 |
| Maleic modified ester gum | 0.7 |
| Blown castor oil | 3.7 |
| Butyl acetate | 16.5 |
| Methyl ethyl ketone | 12.5 |
| Amyl acetate | 5.0 |
| Ethyl alcohol | 3.3 |
| Isopropyl alcohol | 5.8 |
| Butyl alcohol | 4.5 |
| Toluene | 1.5 |
| High solvency petroleum naphtha | 30.3 |
| | 100.0 |

[1] The alkyd resin solution was a 70% solution of a 53% coconut oil modified glyceryl phthalate resin in toluene.

Sufficient of the above sealer composition was applied over the cured undercoat composition to deposit a dry film about .5 mil thick.

One coat of the above laquer sealer was applied by spraying over the substantially cured undercoat and permitted to dry for 60 minutes at room temperature leaving a dry film build of about 0.5 mil. The dry film of cellulose nitrate sealer was sanded initially with #180 abrasive paper and then with progressively finer grades of abrasive paper until the surface had a smoothness comparable to that of plate glass. The microscopic plateaus in the surface were sanded level with the floor of the microscopic valley thereby eliminating any significant undulations in the surface. The sanding operation which was carried out with ease substantially removed the lacquer sealer film from the plateaus and left the lacquer sealer film deposited in the valleys substantially undisturbed.

A final surface coating of the same composition as the above polymerizable wood finishing undercoat composition was applied by spraying several coats to obtain a dry film build of about 2 mils thickness. The final surface coating was cured by force drying for one hour at about 130° F. The finished coated panel without sanding of the top coat showed plate glass-like smoothness, clarity, fullness and highly accentuated apparent depth of finish. The finish was further characterized by strong adhesion to the wooden substrate, resistance to chipping and marring, and freedom from delamination at the interfaces of the several integral coatings constituting the composite finish.

An equally good result was obtained with another panel finished as described above except the sanding lacquer sealer composition was replaced with the following:

*Sanding lacquer sealer composition*

| | Parts by weight |
|---|---|
| Cellulose nitrate | 12.5 |
| Butyl alcohol | 5.4 |
| Methyl isobutyl ketone | 49.8 |
| Methyl ethyl ketone | 32.3 |
| | 100.0 |

A control panel was finished in a manner identical to Example I except that the sanding lacquer sealer composition was omitted and the polymerizable undercoat composition in the cured state was sanded prior to application of the polymerizable surface coat. This panel did not present a surface having the smooth plate glass-like finish.

EXAMPLE II

A previously sanded and stained mahogany panel was sprayed with one double pass of the following composition as a wash coat:

*Polymerizable wood finishing composition*

| | Parts By Wt. | |
|---|---|---|
| Part A: | | |
| Monomeric Dimethacrylate of Triethylene Glycol | 41.8 | |
| Catalyst (10% Cobalt Nitrate in Anhydrous Ethyl Alcohol) | 3.5 | |
| Toluene | 4.7 | |
| Alkyd Resin (55% Castor Oil Modified Glyceryl Phthalate) | 8.4 | |
| Cellulose Nitrate | 8.4 | 18.15 |
| Dehydration Alcohol—Butyl Alcohol | 3.6 | |
| Ethyl Acetate | 5.8 | |
| Anhydrous Ethyl Alcohol | 11.0 | |
| Toluene | 7.8 | |
| High Solvency Petroleum Naphtha (130–190° C. B. R.) | 5.0 | |
| Hydroquinone | Trace | |
| | 100.0 | |
| Part B: | | |
| Toluene | 50.0 | |
| Ethyl Acetate | 25.0 | 81.85 |
| Butyl Acetate | 25.0 | |
| | 100.0 | 100.0 |

The sprayed composition was air dried at room temperature for 30 minutes. Part A of the above composition was applied by means of a brush to the wash-coated panel to fill the pores and grains of the wood and the excess removed by wiping with a soft cloth. The filled panel was air dried for about 45 minutes at room temperature, followed by curing at a temperature of about 130° F.

The following easy sanding lacquer sealer composition was sprayed over the above cured filler composition:

*Easy sanding lacquer sealer composition*

| | Parts by weight |
|---|---|
| Cellulose nitrate | 11.7 |
| Anhydrous ethyl alcohol | 5.0 |
| Blown castor oil | 6.4 |
| Dibutyl phthalate | 0.6 |
| Zinc stearate | 1.3 |
| Butyl acetate | 14.2 |
| Ethyl acetate | 8.7 |
| Butyl alcohol | 2.8 |
| Anhydrous isopropyl alcohol | 11.7 |
| High solvency petroleum naphtha (95–142° C. B. R.) | 37.6 |
| | 100.0 |

The zinc stearate was introduced in the form of a pebble mill ground dispersion of about 23% in lacquer solvents and diluents of the lacquer composition.

Sufficient of the above sealer composition was applied to deposit a dry film of about .5 mil thickness. The sealer coat was allowed to dry for about 60 minutes at room temperature. The dry sealer coat was initially sanded with #180 abrasive paper and then with progressively finer grades of abrasive paper until the surface was glass smooth.

Part A of the above polymerizable wood finishing composition was applied over the smoothly sanded sealer by spraying, sufficient coats being applied to provide a dry film thickness of about 2 mils. This final coating was cured by force drying for 120 minutes in an oven at 130° F. The cured finish without further sanding had a plate glass-like appearance, fullness, and clarity. The finish was tough, mar-resistant, strongly adherent to the wood substrate and resistant to alcoholic beverages. The finish could not be delaminated at any integral coating.

EXAMPLE III

Equally good results were obtained when the following polymerizable wood finishing composition was substituted for the polymerizable undercoat and top coat compositions in Examples I and II.

*Polymerizable wood finishing composition*

| | Parts by weight |
|---|---|
| Cellulose nitrate | 15.7 |
| Dehydration Alcohol—Ethyl alcohol | 9.7 |
| Monomeric dimethacrylate composition | 24.8 |
| Alkyd resin solution | 7.5 |
| Methyl ethyl ketone | 7.0 |
| Ethyl acetate | 10.0 |
| Butyl acetate | 15.0 |
| Anhydrous isopropyl alcohol | 10.0 |
| Cobalt nitrate hexahydrate | 0.2 |
| Benzoyl peroxide | 0.1 |
| | 100.0 |

The monomeric dimethacrylate composition in the above formula is the product resulting from the esterification of a mixture of polyethylene glycols with methacrylic acid, said mixture of glycols having an average molecular weight in the range of 100 to 300 and the component glycols of the mixture being characterized by the empirical formula $HO(CH_2CH_2-O)_nH$ where $n$ is an integer varying from 1 to 20.

While mahogany has been used as the substrate to illustrate the invention, other woods such as, for example, walnut and oak which also require filling may be finished in the same manner. In these instances, stains and color pigments differing from those used with mahogany are employed to accentuate the grain pattern of these woods.

The invention is also applicable to woods which are not ordinarily filled, such as birch and maple. When the filler is not used, the easily sandable sealer is applied over the cured undercoat which had been applied either as a wash coat, primer or preliminary sealer.

The composition of the easily sandable sealer is not particularly critical in the practice of this invention. Any of the conventional cellulose nitrate sanding lacquer sealers used by the wood finishing trade may be used. The cellulose nitrate in the sanding sealer compositions is preferably ½ second viscosity or higher. The solvent or solvent mixture in the sanding sealer is generally selected to accomplish rapid release from the coating on drying. Sanding aids in the form of substantially insoluble metallic soaps are often incorporated in the sealer to enhance the sanding ease, as illustrated in Example II. While sealers containing additives to facilitate sanding can be tolerated in the practice of this invention, sealers which do not contain metallic soaps and similar sanding aids are preferred because omission of such components generally provides improved strength, toughness and clarity to the sealer. Even in the absence of sanding aids, the lacquer sealer is easily sandable in comparison with the sanding characteristics of the cured acrylic finishes. The use of non-clogging abrasive paper in sanding the sealer further increases the ease of sanding to the desired degree of smoothness.

A film build of about 0.5 mil for the sanding sealer is generally adequate to provide easy sanding of the coated wooden substrate to the desired smoothness. However, a film build of 1 mil or even 2 mils of sanding sealer can be applied if the irregular pattern of the surface after filler application requires a coating of this magnitude to leave the depressions full after the sanding operation. Requirement of such thick films of sanding sealer would be an indication of filler deficiency, in which case the preferred practice would be to increase the amount of filler rather than use an abnormally thick coat of sanding sealer to remedy filler deficiency.

The polymerizable diester compositions used as the undercoat immediately under the easily sandable lacquer sealer and the polymerizable diester compositions used as a top coat immediately over the sanded lacquer sealer may each be varied widely in the practice of this invention. The methacrylic acid diesters of the 4 to 10 carbon atom aliphatic dihydric alcohols are the preferred species of the polymerizable monomeric component. Representative dihydric alcohols for esterification of the acrylic diester include diethylene glycol, triethylene glycol, tetraethylene glycol, pentamethylene glycol, hexamethylene glycol, and tripropylene glycol. These monomeric compositions may be modified with linear polymers, such as cellulose esters and alkyd resins, and with placticizers to obtain the desired balance of film properties. Preferred compositions contain from about 45 to 65% by weight of the polymerizable monomer based on the combined weight of the monomer and the non-volatile content of its film forming modifiers. The compositions may be further modified with dyes, pigments, and inert extenders, but opaque coloring matter generally is not added to the composition because clarity of the finish is highly desirable.

While the examples show the preferred use of methacrylic acid diesters of lower aliphatic dihydric alcohols in the undercoat and top coat having smoothly sanded lacquer sandwiched between, acrylic acid diesters of the same aliphatic dihydric alcohols may be substituted in part or wholely for the described methacrylic acid diesters. The acrylic acid diesters are lower melting and softer than the corresponding methacrylate esters, but they offer no greater ease of processing to the desired degree of smoothness.

The preliminary coatings, such as stain, wash coat, filler and primary sealer, are applied in the conventional manner prior to application of the lacquer sealer. There are no particularly critical procedures in the processing of the preliminary coatings with the exception that the polymerizable undercoat over which the lacquer sealer is applied shall be adequately cured. The cure must be sufficient to minimize any swelling and subsequent shrinkage of the immediate undercoat when lacquer sealer is applied thereover and dried. Curing of the polymerizable undercoat is preferably carried out by force drying for a period of 30 to 120 minutes at a temperature in the range of about 120 to 150° F. A longer curing period is not detrimental to the finish. Shorter time of cure is operative at higher temperatures, such as force drying for 20 minutes at 160° F. or heating for 15 minutes under an infrared lamp. Use of higher temperatures is undesirable because of the dehydrating effect on the wood and blistering. The same limitations apply to the polymerizable top coat composition which is superimposed over the smoothly sanded lacquer sealer.

This invention particularly has utility in the finishing of furniture where high quality is reflected by the smoothness, fullness, clarity and luster of the finish which accentuates the choice substrate wood. In addition, the finish is serviceable and highly durable through its mar resistance, scratch adhesion, chemical resistance and resistance to weathering.

It is apparent that many widely different embodiments of this invention can be made without departing from the spirit and scope thereof, and, therefore, it is not intended to be limited except as indicated in the appended claims.

I claim:

1. An improved method of finishing wood comprising the steps of applying to a wooden substrate a polymerizable undercoat composition comprising cellulose nitrate and at least 45% of a monomeric acrylic diester selected from the group consisting of acrylic acid diesters and methacrylic acid diesters of a lower aliphatic dihydric alcohol in a volatile organic solvent, curing said undercoat to an insoluble stage by heating, superimposing over said cured undercoat a sandable cellulose nitrate containing sealer coating composition in a volatile organic solvent, drying said sealer coat, sanding said dried sealer coat to a desired degree of smoothness and applying over the said sanded sealer at least one coat of polymerizable surface coating composition comprising cellulose nitrate and at least 45% of a monomeric acrylic diester selected from the group consisting of acrylic acid diesters and methacrylic acid diesters of a lower aliphatic dihydric alcohol in an organic volatile solvent, and heating said polymerizable surface coating to cure said acrylic diester, said percentages being based on the total weight of non-volatile film forming components in the respective compositions.

2. The method of claim 1 which comprises applying a wood filler composition to the wooden substrate prior to application of said polymerizable acrylic diester undercoat composition.

3. An article of manufacture comprising a wooden substrate and a composite organic finish strongly adhered thereto and having a surface characterized by a plate glass-like smoothness, said composite finish comprising a plurality of superimposed coatings including the combination of a cured undercoat film comprised of polymerized cellulose nitrate and at least 45% of an acrylic diester selected from the group consisting of acrylic acid diesters and methacrylic acid diesters of a lower aliphatic dihydric alcohol, a lacquer sealer coat comprising cellulose nitrate superimposed directly over said cured undercoat, the surface of said sealer coat having been sanded to glass-like smoothness, and a cured top coat finish comprised of cellulose nitrate and at least 45% of a polymerized acrylic diester selected from the group consisting of acrylic acid diesters and methacrylic acid diesters of lower aliphatic dihydric alcohol superimposed directly over said sanded sealer coat, said percentages being based on the total weight of the non-volatile film forming components in the respective compositions.

4. The article of claim 3 in which said polymerized acrylic diester is a methacrylic acid diester of an aliphatic dihydric alcohol having 4 to 10 carbon atoms.

5. The article of claim 3 in which said polymerized acrylic diester is a methacrylic acid diester of triethylene glycol.

6. The article of claim 3 in which said polymerized acrylic diester is a mixture of methacrylic acid diesters of a mixture of aliphatic dihydric alcohols having an average molecular weight in the range of 100 to 300 and characterized by the empirical formula $$HO(CH_2-CH_2O)_nH,$$

where $n$ is an integer of from 1 to 20.

7. The article of claim 3 comprising said combination of cured undercoat, sanded sealer and cured top coat applied over a wooden substrate previously filled with a wood filler composition.

8. The method of claim 1 in which the polymerizable undercoat composition and the surface coat composition each contain an alkyd resin.

9. The article of claim 3 in which the cured undercoat and the cured top coat each contain an alkyd resin.

References Cited in the file of this patent

UNITED STATES PATENTS

| | | |
|---|---|---|
| 1,927,086 | Ellis | Sept. 19, 1933 |
| 2,129,722 | Woodhouse | Sept. 13, 1938 |